United States Patent [19]

Stube et al.

[11] 3,741,325
[45] June 26, 1973

[54] WEIGHING MECHANISMS
[75] Inventors: Richard Stube, Gevelsberg; Gunther Rimanek, Neider-Roden, both of Germany
[73] Assignee: said Stube, by said Rimanek, Gevelsberg, Germany
[22] Filed: Oct. 13, 1971
[21] Appl. No.: 188,973

[30] Foreign Application Priority Data
Jan. 20, 1971  Germany.................. P 21 02 519.4

[52] U.S. Cl..................... 177/32, 177/170, 177/230
[51] Int. Cl. ....................... G01g 23/14, G01g 23/26
[58] Field of Search................... 177/32, 168, 169, 177/170, 200, 225, 229, 230, 234, 245, 251

[56] References Cited
UNITED STATES PATENTS
3,387,676  6/1968  Porter............................ 177/245 X
3,373,830  3/1968  Thomson....................... 177/229 X
2,445,022  7/1948  Colman............................... 177/32
3,547,210  12/1970  Zimmerman................... 177/200 X Primary Examiner—George H. Miller, Jr.
Attorney—George F. Williamson and Herman H. Bains

[57] ABSTRACT

A weighing mechanism is capable of giving a direct reading of the quantity by weight of a substance contained in a quantity of mixture where the proportion of the substance in the mixture is known. The weighing mechanism includes a load member deflectable by the weight of objects to be weighed. A spring resists deflection of the load member and an indicator is provided which is adapted to be moved in response to deflection of the load member. An adjustable linkage is provided between the load member and the indicator, and adjustment of the linkage changes the relationship between deflection of the load member and movement of the indicator.

7 Claims, 4 Drawing Figures

PATENTED JUN 26 1973 3,741,325

Inventors
RICHARD STUBE
GUNTHER RIMANEK
By Williamson, Bains
& Moore ATTORNEYS

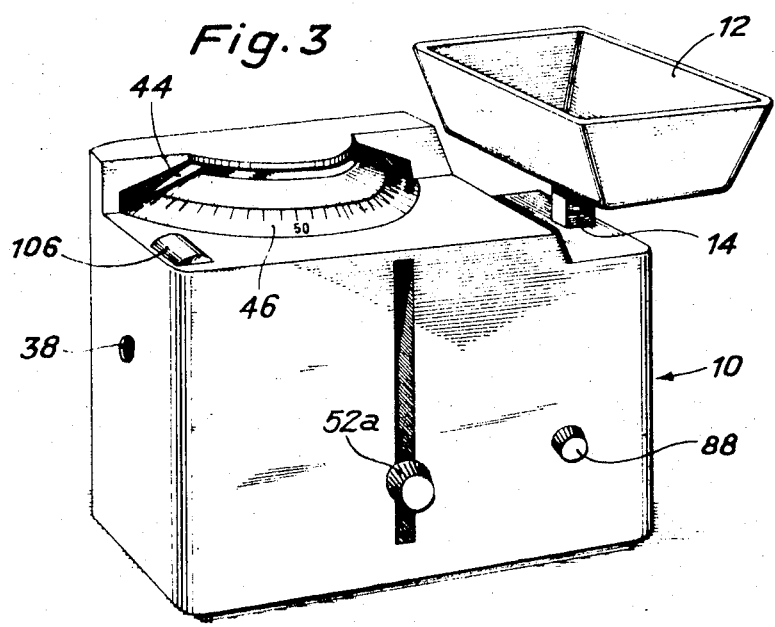
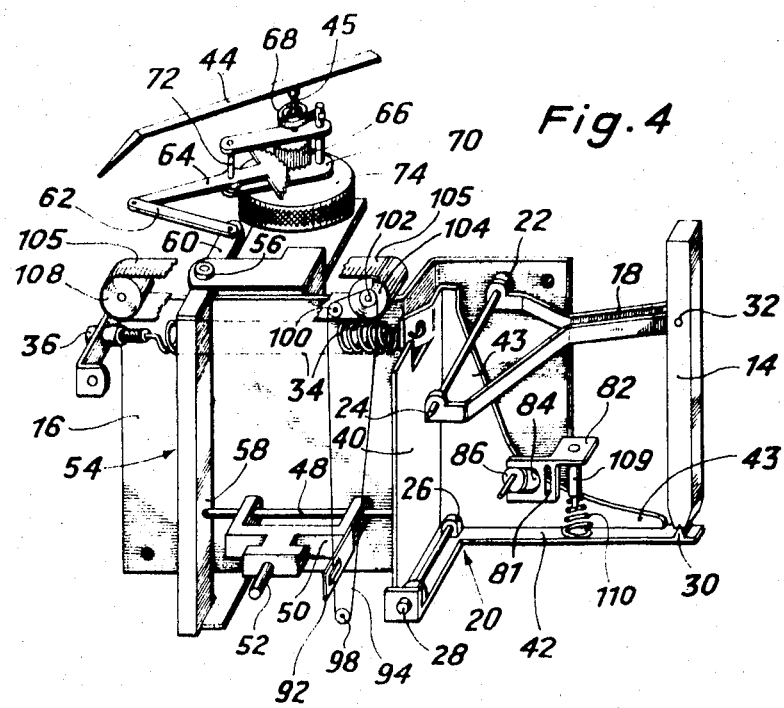

WEIGHING MECHANISMS

BRIEF SUMMARY OF THE INVENTION

An object of this invention is the provision of a mechanism capable of giving a direct scale reading of the quantity by weight of a substance contained in a quantity of mixture where the proportion of the substance in the mixture is known. This kind of mechanism is particularly useful for example in determining the absolute content of carbohydrates, albumen, fat or calories in a given quantity of foodstuff. It will be readily appreciated that this purpose cannot be fulfilled by a normal weighing machine.

Governed by a particular function, which differs in accordance with the construction of the weighing mechanism, the movement of the indicator will depend upon the load and in the simplest case will be directly proportional to the load. The value actually indicated however will depend not only upon the load itself, but also upon the particular setting selected for the adjustable linkage. If for example, it is required to determine the weight of carbohydrates contained in a random quantity of potatoes, the adjustable linkage is set to a value of "20 percent " in correspondence with the known percentage content of carbohydrates in potatoes. The mechanism is then such that the indicator gives a value which corresponds to one-fifth of the total deflection of the load member. For sugar on the other hand, the adjustable linkage is set to "100 percent ", and the deflection of the load member is completely transmitted to the indicator. The same quantity by weight of potatoes and sugar thus results in different indicated weights, and in the example selected these weights depend upon the carbohydrate content.

Preferably, associated with the adjustable linkage is a scale on which each selected position of the linkage means can be read off. Then, either percentage figures are associated with the individual scale values or in the case where the quantity of carbohydrates or the calories is to be determined in foodstuffs, the designations of the corresponding foodstuffs themselves are directly associated with the scale values. It will be understood that a different scale has to be selected for carbohydrates than for albumen or fat for example. When the weighing mechanism of the invention is to be used for determining the proportions of substances in foodstuffs, then different scales are accordingly associated with the adjustable linkage.

It is expedient to provide a calibrating device incorporating a standard weight, for example a 100 g weight. This applies particularly if the weighing mechanism is intended for determining the absolute proportion of certain substances in foodstuffs, since the relative proportion is usually related to 100 g of the foodstuff.

BRIEF DESCRIPTION OF THE FIGURES OF THE DRAWINGS

Two embodiments of the invention will now be described by reference to the accompanying drawings of which:

FIG. 3 is a perspective view of a second weighing instrument, and FIG. 4 illustrates semi-schematically the weighing mechanism of the instrument shown in FIG. 3.

DETAILED DESCRIPTION OF THE INVENTION

The instrument shown in FIGS. 1 and 2 will first be described. The instrument comprises a casing 10 in which is accommodated the mechanism illustrated in FIG. 2; material to be weighed is placed in a pan 12.

Figure 2:
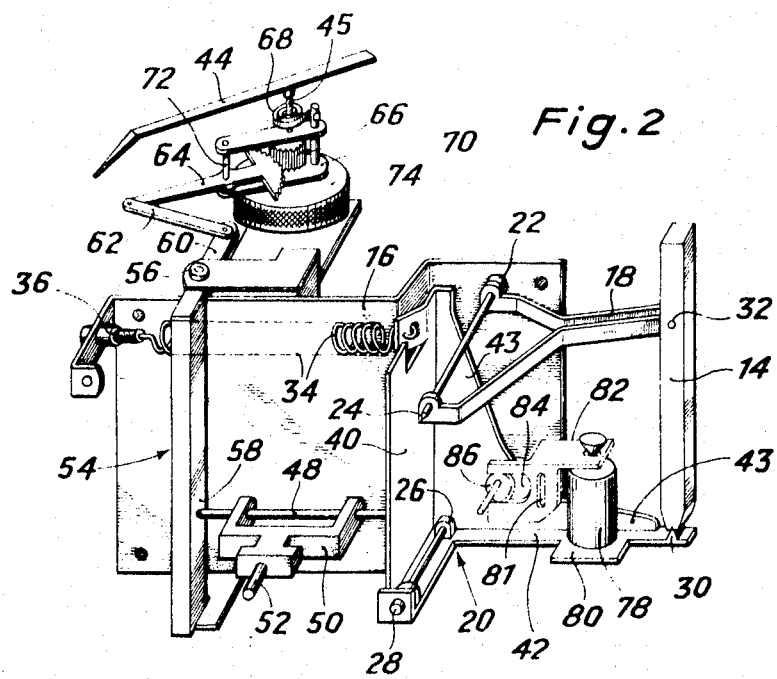
FIG. 2 illustrates semi-schematically the weighing mechanism of the instrument seen in FIG. 1.

The load on the pan 12 is transmitted to a load column 14 which can be seen more clearly in FIG. 2.

The mechanism, as is frequently the case in instruments of this kind, is accommodated between two bracket plates, one only of which, i.e., plate 16, can be seen in FIG. 2, whereas the other plate has been omitted from the drawing in order to provide a clear illustration. A guide arm 18 and the actual weighing arm 20 are pivotally mounted between the plates; in the example illustrated, the guide arm 18 is pivotable in point bearings at 22 and 24, whereas the weighing arm 20 is pivotable likewise in point bearings 26 and 28 near the lower edges of the bracket plates.

The load column 14 is hinged to the guide arm at 32, whereas the horizontal limb 42 of the weighing arm 20 has a knife-edge bearing 30 at its free end, the column 14 being mounted on this bearing. A helical spring 34, which provides the return force for the weighing arm 20, bears against the upright limb 40 of the weighing arm near the upper end of said limb. It will be understood that the helical spring may also be replaced by a leaf spring or a torsion spring. A setting device 36, accessible through an opening 38 in the casing 10, is provided for adjusting the spring bias.

It will be seen that the angular deflection of the weighing arm will be proportional to the load on the pan 12, within satisfactory limits of accuracy.

The weighing arm is reinforced by a plate portion 43 which extends at right-angles to the vertical limb 40 as well as to the substantially horizontal limb 42. The plate portion 43 extends parallel to the bracket plate 16 and, as will be seen in FIG. 2, the entire arm 20 is a sheet-metal angled element consisting of the parts 40, 42 and 43 which are bent into the form of the weighing arm.

A pointer or indicator 44, associated with the scale 46, is provided for indicating the deflection of the weighing arm 20. Transmission from the weighing arm 20 to the pointer 44 is by way of a probe pin 48 which is slidably mounted in an adjusting element formed as a slide, the arrangement being such that for a first approximation, the displacement of the probe pin 48 is equal to the arc of the pivotal movement of the weighing arm 20. The slide 50 comprises a substantially U-shaped plate in the limbs of which are provided bores for accommodating the probe pin 48 and, additionally, guide grooves with the aid of which the slide 50 rests in a guide slot which is formed in the front bracket plate (not illustrated) which, together with the bracket plate 16, constitutes the frame of the mechanism. Secured on a stud 52 on the slide 50 is an actuating knob 52a by means of which the slide 50 can be moved vertically up and down parallel with the upright lever arm 40 of the weighing lever. The actuating knob 52a carries one or more pointers with which is associated a scale 76 provided on the casing 10 (see FIG. 1).

The probe pin 48 constantly bears against the upright limb 40 of the weighing arm 20 under slight spring bias. This effect is achieved by a transmission lever bearing against that end of the probe pin 48 remote from the weighing arm, the transmission lever being pivotable on a vertical axis with the aid of point bearings; only the upper bearing 56 can be seen in the drawing. The transmission lever 54 has a stop web 58 which extends exactly parallel with the vertical limb 40 of the weighing arm when no load is on the pan 12.

The transmission lever 54 is of double-armed construction. At its free end 60 there is linked a guide 62 for transmitting the pivotal movement to a segmental rack 64 which meshes with a pinion 66 solidly mounted on the spindle 45 of the pointer 44. Also, a spiral spring 68, the bias of which is transmitted through the described link arrangement to the lever 54 and holds the probe pin 48 in contact with the weighing arm, acts on the spindle 45 of the pointer. The bias of the spring 68 is taken into account when adjusting the spring 34. The spindle 45 of the pointer together with the pinion 66 is mounted in a setting frame in which is also mounted, by means of a spindle 72, the segmental rack 64, and the entire frame is secured to a knurled knob 74. The latter is adapted to rotate about an axis aligned with the spindle 45 of the pointer, and for this purpose, the knob is accessible from the rear side of the casing 10. The zero setting of the pointer 44 can thus be corrected without the forces acting on the probe pin 48 being noticeably altered. Optionally, the knurled knob 74 may be replaced by a worm wheel meshing with an adjusting worm, since self-locking can be achieved by means of a worm.

It will be seen that the deflection of the pointer 44 will be proportional to the load on the pan 12, within certain limits of accuracy, but that the proportionality factor depends upon the position of the slide 50, i.e. that the measuring range can be adjusted by moving the slide 50 by means of the knob 54. The scale 76 can be divided into measuring ranges as explained above.

For the purpose of calibrating the instrument, there is provided a calibrating weight 78 which can be lowered on to a projection 80 formed on the weighing arm 20. For this purpose there is arranged in the bracket plate not illustrated in the drawing a lifting mechanism which is vertically displaceable and consists of a sheet-metal angled element 82 containing a guide slot 81 and a recess 84 in which is mounted an eccentric disc 86. An actuating knob 88, by means of which the sheet-metal angled element 82 can be raised and lowered, is mounted on the spindle of the eccentric disc. A slot in the sheet-metal angled element 82 embraces the neck of the weight 78 which when placed upon the extension 80 is centered with the help of means not illustrated.

The form of construction shown in FIGS. 3 and 4 corresponds substantially to that illustrated in FIGS. 1 and 2; the same reference numerals are therefore used for like parts, and only modifications will be described.

Instead of the scale 76, another mechanism is provided here for obtaining reproducible settings of the slide 50. The slide 50 carries a clamping tongue 92 in which a continuous loop 94 of cord is clamped and held fast. The loop 94 of cord passes over guide rolls 98 and 100 and is in frictional engagement with a grooved roller 102 associated with a drum 104 which is thus rotated in the clockwise or anti-clockwise direction when the slide 50 is moved upwards or downwards. Laid around the drum 104 is a graduated tape 105 which is likewise endless and the divisions of which, read off through a lens 106 (FIG. 3) which magnifies the marks on the tape, indicate in each case the position of the slide 50 in a reproducible manner. The ratio of the diameter of the grooved roller 102 and the drum 104 enables the scale to be extended so that the setting of the slide 50 can be carried out with greater accuracy. The graduated tape is returned over a second idling drum 108.

Figure 1:
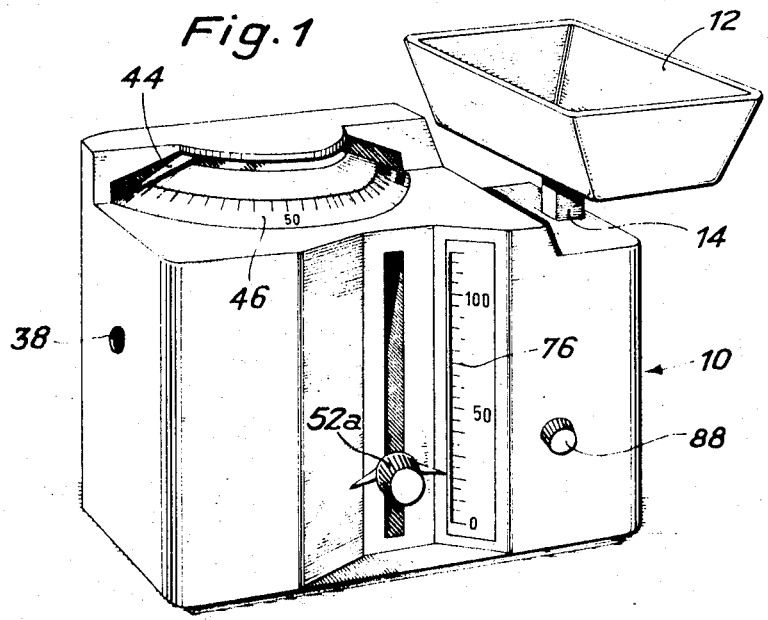
FIG. 1 is a perspective illustration of one weighing instrument having a mechanism in accordance with the invention.

The calibrating device employing the weight 78 is replaced by a rod 109 which is fitted on the sheet-metal angled element 82, extends downwardly towards the weighing arm 20 and carries at its free end a tapered helical spring 101 which when the rod 109 is fully lowered applies a predetermined force to the weighing lever 20, in a manner similar to that of the weight loading arrangement in the embodiment illustrated in FIGS. 1 and 2. In this position, the arrangement is also used for spring-damping of the weighing arm 20 during transportation of the measuring instrument.

What is claimed is:

1. A weighing mechanism including:
   a load member deflectable by the weight of objects to be weighed;
   spring means resisting deflection of the load member;
   an indicator arranged to move in dependence upon deflection of the load member; and
   an adjustable linkage between the load member and the indicator, adjustment of which linkage changes the relationship between the deflection of the load member and movement of the indicators, said adjustable linkage including a weighing arm which is connected to said load member and which is vertical in the unloaded condition and is arranged to swing under load, a vertical transmission lever connected to said indicator, and a probe pin which is guided for movement in the horizontal direction and which bears against said weighing arm and said transmission lever and is movable also in the vertical direction to effect the said adjustment.

2. A weighing mechanism according to claim 1, wherein the probe pin is linked to a movable graduated tape through a cable drive, marks on the graduated tape corresponding to the position in which the probe pin is set.

3. A weighing mechanism according to claim 1 wherein the said indicator includes a pointer movable across a scale and which is linked to said transmission lever by a link arrangement comprising a segmental rack which meshes with a pinion on a spindle carrying the pointer and further includes a spiral spring supported on the spindle applying a spring load to urge said transmission lever towards the vertical limb of the weighing arm.

4. A weighing mechanism according to claim 1, wherein the weighing arm is mounted to swing about a horizontal axis between two vertical parallel bracket plates and comprises a piece of sheet-metal which is bent at right-angles, one limb extending vertically and the other limb extending horizontally between the bracket plates, a helical spring engaging the upper end of the vertical limb of the weighing arm and the free end of the horizontal limb carrying a knife-edge which supports a load column.

5. A weighing mechanism according to claim 4, wherein the transmission lever is rotatable about a vertical axis and a probe pin is horizontally slidable in a U-shaped plate disposed between the transmission lever and the vertical limb of the weighing arm.

6. A weighing mechanism according to claim 5, including a calibrating weight which can be lowered on to the free end of the horizontal limb of the weighing arm.

7. A measuring instrument according to claim 5, including a calibrating spring which can be compressed against the weighing arm to apply a predetermined load thereto.

* * * * *